(12) United States Patent
Kim et al.

(10) Patent No.: US 8,854,007 B2
(45) Date of Patent: Oct. 7, 2014

(54) PROTECTION CIRCUIT FOR BATTERY PACK

(75) Inventors: Jin-Wan Kim, Yongin-si (KR); Susumu Segawa, Yongin-si (KR); Eui-Jeong Hwang, Yongin-si (KR); Se-Sub Sim, Yongin-si (KR); Jong-Woon Yang, Yongin-si (KR); Han-Seok Yun, Yongin-si (KR); Beom-Gyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 524 days.

(21) Appl. No.: 12/960,395

(22) Filed: Dec. 3, 2010

(65) Prior Publication Data

US 2011/0156654 A1   Jun. 30, 2011

(30) Foreign Application Priority Data

Dec. 29, 2009   (KR) .................. 10-2009-0132740

(51) Int. Cl.
*H02J 7/00*   (2006.01)
(52) U.S. Cl.
CPC ............. *H02J 7/0031* (2013.01); *H02J 7/0004* (2013.01)
USPC ............................ 320/134; 320/145; 320/162
(58) Field of Classification Search
CPC ............. H02J 7/022; H02J 7/0031; H02J 7/14
USPC ......................................... 320/134, 162, 145
See application file for complete search history.

(56) References Cited

U.S. PATENT DOCUMENTS

| 6,137,265 A * | 10/2000 | Cummings et al. ........... 320/133 |
| 7,518,341 B2 | 4/2009 | Wang et al. |
| 2005/0134231 A1 | 6/2005 | Cho |
| 2006/0139008 A1 * | 6/2006 | Park .............................. 320/134 |
| 2009/0001935 A1 | 1/2009 | Odaohhara |
| 2009/0027011 A1 * | 1/2009 | Umetsu ......................... 320/145 |
| 2009/0295334 A1 | 12/2009 | Yang et al. |

(Continued)

FOREIGN PATENT DOCUMENTS

| CN | 1790857 A | 6/2006 |
| JP | 11-098702 | 4/1999 |

(Continued)

OTHER PUBLICATIONS

SIPO Office action regarding Patent Application No. 201010611951.4 dated Mar. 1, 2013, 6 pages.

(Continued)

*Primary Examiner* — Drew A Dunn
*Assistant Examiner* — Nathaniel Pelton
(74) *Attorney, Agent, or Firm* — Christie, Parker & Hale, LLP

(57) ABSTRACT

A protection circuit of a battery pack capable of detecting the error of a charging device from the battery pack. The protection circuit of the battery pack having a battery cell charged by a charging device, the protection circuit including a charge switch coupled to a high current path (HCP), the charge switch disposed between the battery cell and the charging device charging the battery cell and a controller sensing a voltage or a current of the charging device during a charge stop period stopping a charging of the battery cell and determining whether an error of the charging device occurs according to the voltage or the current of the charging device.

15 Claims, 5 Drawing Sheets

(56) References Cited

U.S. PATENT DOCUMENTS

| | | | |
|---|---|---|---|
| 2010/0072951 A1* | 3/2010 | Nakashima | 320/145 |
| 2010/0194339 A1* | 8/2010 | Yang et al. | 320/116 |
| 2010/0194348 A1* | 8/2010 | Wang et al. | 320/136 |
| 2011/0175569 A1* | 7/2011 | Austin | 320/109 |

FOREIGN PATENT DOCUMENTS

| | | | |
|---|---|---|---|
| JP | 3836152 | | 8/2006 |
| JP | WO/2008/078552 | * | 7/2008 |
| JP | 2009-072002 | | 4/2009 |
| KR | 10-1999-0028876 A | | 4/1999 |
| KR | 10-2005-0064259 | | 6/2005 |
| KR | 10-2006-0034131 A | | 4/2006 |
| KR | 10-2008-0036412 A | | 4/2008 |
| KR | 10-2009-0126097 | | 12/2009 |
| WO | WO 97/49159 | | 12/1997 |

OTHER PUBLICATIONS

EPO Search Report dated Apr. 16, 2013, for corresponding European Patent application 10252242.2, (5 pages).

SIPO Office action dated Oct. 21, 2013, for corresponding Chinese Patent application 201010611951.4, (8 pages).

* cited by examiner

PROTECTION CIRCUIT FOR BATTERY PACK

CROSS-REFERENCE TO RELATED APPLICATIONS

This application claims the benefit of Korean Patent Application No. 10-2009-0132740, filed Dec. 29, 2009, in the Korean Intellectual Property Office, the disclosure of which is incorporated herein by reference.

BACKGROUND

1. Field

Aspects of the present invention relate to a protection circuit of a battery pack, the protection circuit detecting the error of a charging device in the battery pack.

2. Description of the Related Art

Recently, as portable apparatuses such as a mobile telephone, a portable audio apparatus, and a digital camera are widely used, use of a secondary battery is rapidly increasing. The secondary battery is portable since the secondary battery has high stability and is small and thin in size.

As a method of charging the secondary battery, a constant current-constant voltage (CC-CV) charging method is used. In the CC-CV charging method to charge the secondary battery, after charging is performed by a uniform constant current, charging is performed by a constant voltage corresponding to a voltage reaching a predetermined voltage, such as a voltage close to a full charge potential of the secondary battery.

In addition, as another method of charging the secondary battery, a pulse charging method disclosed in the U.S. Pat. No. 4,736,150 is used. In the pulse charging method, a pulse in the range between 0.1 to 10 Hz is applied at intervals between 1 ms and 9 ms so that the secondary battery is charged. When the pulse charging method is used, the correctness of the full charge is higher than in the CC-CV charging method.

SUMMARY

Aspects of the present invention provide a protection circuit for a battery pack capable of detecting the error of a charging device for charging the battery pack by the battery pack.

Aspects of the present invention provide a protection circuit for a battery pack capable of displaying information on the error of a charging device on the outside or of informing a user of the information on the error of the charging device.

Aspects of the present invention provide a protection circuit of a battery pack having a battery cell charged by a charging device, the protection circuit including a charge switch coupled to a high current path (HCP), the charge switch disposed between the battery cell and the charging device charging the battery cell; and a controller sensing a voltage or a current of the charging device during a charge stop period stopping the charging of the battery cell and determining whether an error of the charging device occurs according to the voltage or the current of the charging device.

According to an aspect of the present invention, the charge stop period includes a period in which the charge switch is turned off in at least one of periods between adjacent pulses of a pulse charging of the battery cell.

According to an aspect of the present invention, the controller compares the voltage of the charging device with a reference voltage corresponding to a charge voltage characteristic of the battery cell and determines whether the error occurs according to the comparison result.

According to an aspect of the present invention, the charge stop period includes a period in which the charge switch is turned off when the battery cell is charged by a constant current-constant voltage (CC-CV) method.

According to an aspect of the present invention, the controller turns off the charge switch for predetermined time during the charge of the battery cell.

According to an aspect of the present invention, the controller compares the voltage or the current of the charging device with a reference voltage or a reference current corresponding to a CC-CV characteristic and determines whether the error occurs according to the comparison result.

According to an aspect of the present invention, the controller outputs information on the error to the charging device.

According to an aspect of the present invention, the protection circuit of the battery pack further includes an outputting unit for displaying information on the error by a light, a sound, or a combination of the light and the sound.

According to an aspect of the present invention, the information on the error is transmitted to the charging device.

According to an aspect of the present invention, the protection circuit of the battery pack further includes a blocking unit blocking coupling between the charging device and the battery cell when the error occurs.

According to an aspect of the present invention, the blocking unit includes a fuse coupled to the HCP in series, a heater having a first terminal coupled to an end of the fuse, and a control switch coupled between a second terminal of the heater and a ground. The gate terminal of the control switch is coupled to the controller.

According to an aspect of the present invention, the protection circuit of the battery cell further includes a discharge switch coupled to the HCP and disposed in series between the battery cell and the charging device.

According to an aspect of the present invention, the controller includes an analog front end (AFE) integrated circuit (IC) and a microcontroller.

According to an aspect of the present invention, the protection circuit of the battery pack further includes an external terminal. The external terminal includes a first power source terminal coupled to the HCP, a second power source terminal coupled to the HCP, and at least one signal terminal transmitting information on the error to the charging device.

According to aspects of the present invention, when the battery pack is charged by a CC-CV charge, a pulse charge, or a combination of the CC-CV charge and the pulse charge, the voltage or current of the charging device is sensed in a natural or forced charge stop period to easily detect the error of the charging device. In addition, the error of the charging device is displayed on the outside of the battery pack or the charge of the battery pack is stopped to prevent the battery pack from being damaged. The error of the charging device is transmitted to the charging device or is announced to a final user through the charging device so that it is possible to prevent the ignition or explosion of the battery pack due to the abnormal charge of the battery pack.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
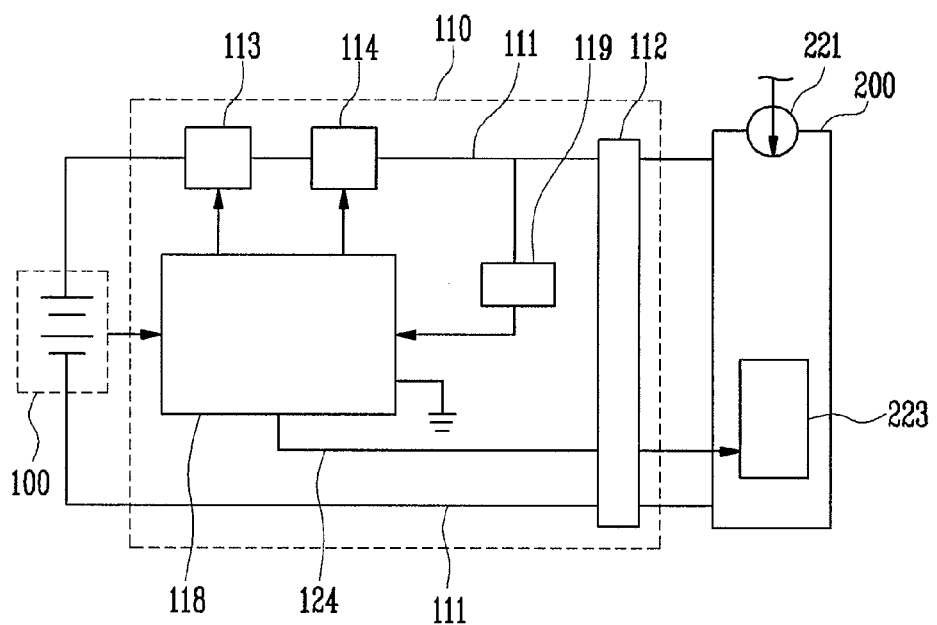
FIG. 1 is a schematic circuit diagram illustrating a protection circuit of a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Hereinafter, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout. Furthermore, the thickness of layers and regions are exaggerated for clarity.

Figure 2:
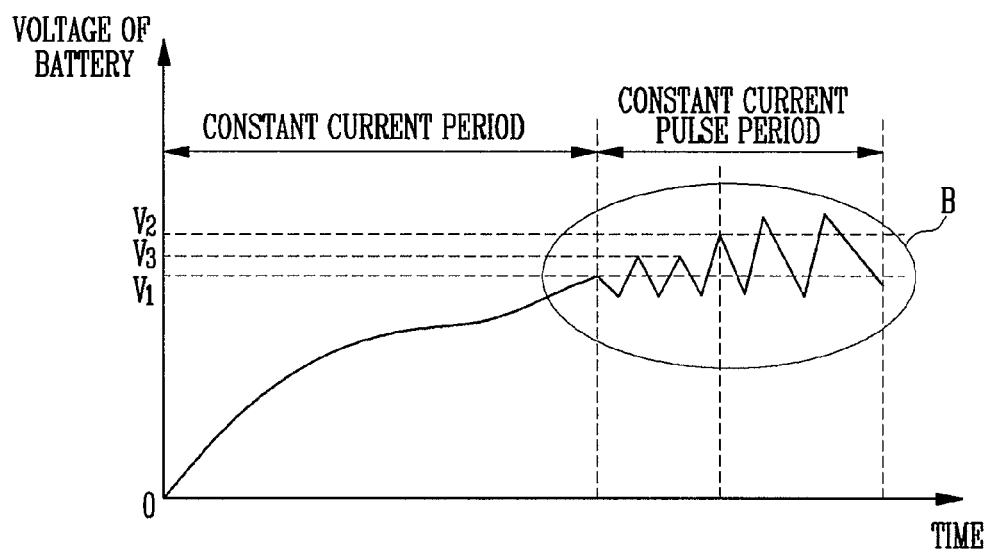
FIGS. 2 and 3 are graphs illustrating processes of operating the protection circuit of the battery pack according to the embodiment of FIG. 1.
Figure 3:
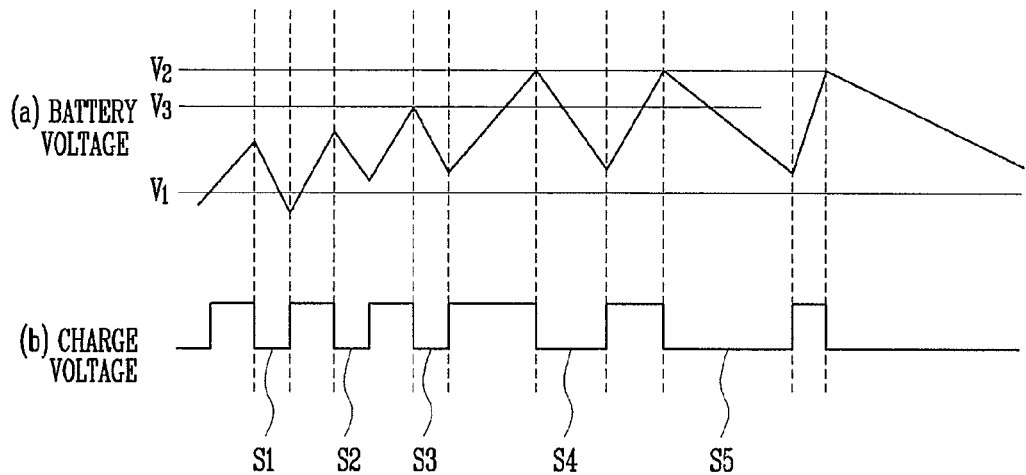
Figure 4:
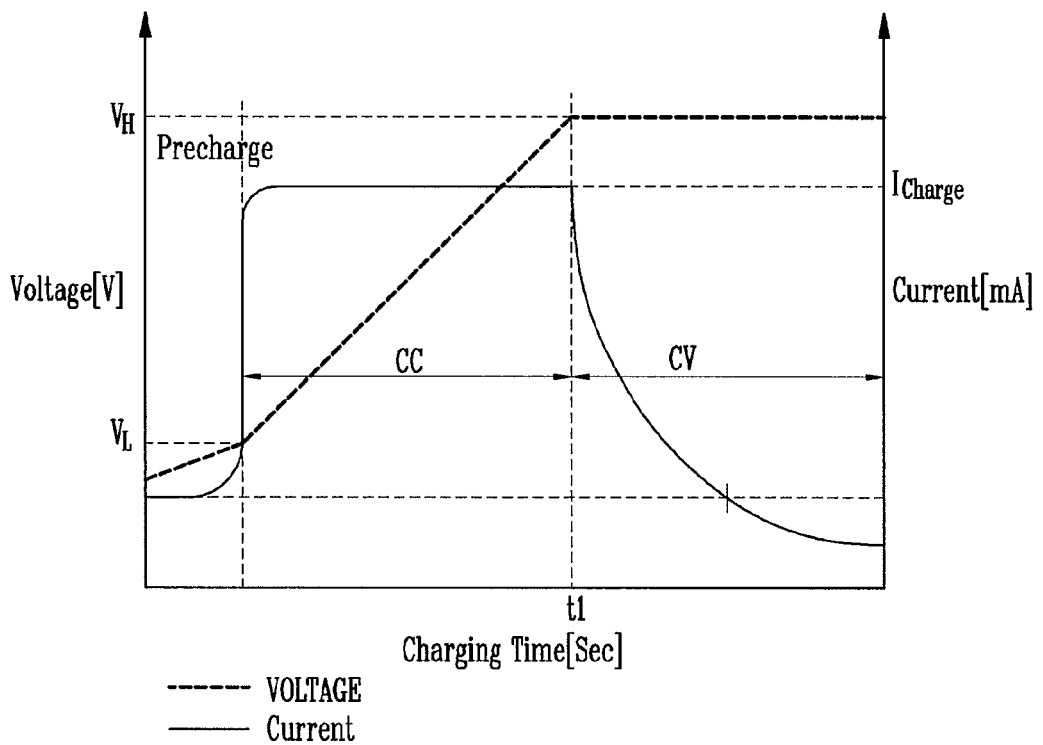
FIG. 4 is a graph illustrating processes of operating a protection circuit of a battery pack according to an embodiment of the present invention.

FIG. 1 is a schematic circuit diagram illustrating a protection circuit for a battery pack according to an embodiment of the present invention. FIGS. 2 and 3 are graphs illustrating processes of operating the protection circuit for the battery pack according to the embodiment of FIG. 1. FIG. 4 is a graph illustrating processes of operating a protection circuit for a battery pack according to an embodiment of the present invention.

Referring to FIG. 1, a protection circuit 110 of a battery pack couples a battery cell 100 and an external system 200 to each other and protects the battery cell 100 against erroneous operation or an error of the external system 200. The battery pack includes the battery cell 100 and the protection circuit 110.

The protection circuit 110 includes an external terminal 112, a charge element 113, a discharge element 114, a controller 118, and a detecting unit 119. In addition, the protection circuit 110 includes a signal line 124 transmitting the erroneous operation or the error of the external system 200 to a controller 223 of the external system 200. The signal line 124 is coupled to the external terminal 112 via a signal terminal (not shown). The charge element 113 and the discharge element 114 may also be referred to as a charge switch and a discharge switch, respectively.

The external terminal 112 couples a power source terminal (not shown) of the external system 200 and a power source terminal (not shown) of the battery cell 100 in the battery pack to each other. The charge element 113 and the discharge element 114 are connected in series along a high current path 111 between the external terminal 112 and the battery cell 100. The charge element 113 and the discharge element 114 are power switches. However, aspects of the present invention are not limited thereto, and the charge element 113 and the discharge element 114 may be other suitable elements.

The detecting unit 119 is coupled to the high current path 111 to detect a voltage or a current on the high current path 111. The detecting unit 119 detects a voltage or a current of a charging device of the external system 200 in the state where the charge element 113 and the discharge element 114 are turned off.

The controller 118 controls the charge element 113 and the discharge element 114 to control a charge or a discharge mode of the battery cell 100. In addition, in the charge mode of the battery cell 100, the controller 118 senses the voltage or current of the charging device of the external system 200 through the detecting unit 119 in a charge stop period. The controller 118 determines whether an error of the charging device occurs according to the sensed voltage or current of the charging device of the external system 200.

For example, as illustrated in FIGS. 2 and 3, when the battery cell 100 is charged by a charging method including a pulse charge period, the controller 118 senses a charging voltage applied from the charging device of the external system 200 to the battery cell 100. The charging voltage is sensed by the controller 118 in at least one of intermittent charge stop periods S1 to S5 during the pulse charge period in order to determine an abnormal charge state of the charging device.

As another example, illustrated in FIG. 4, when the battery cell 100 is charged by a constant voltage-constant current (CV-CC) charge method, the controller 118 arbitrarily turns off the charge element 113 for a moment in order to generate the charge stop period. The controller 118 senses the charge voltage or the charge current applied from the charging device of the external system 200 to the battery cell 100 in the charge stop period in order to determine the abnormal charge state of the charging device. The charge stop period is set to be at short time intervals so as to not affect the charge capacitance of the battery cell 100. For example, the charge stop period is set at a maximum of 200 μs time intervals. However, aspects of the present invention are not limited thereto, and the charge stop period may be set to other suitable time intervals.

Figure 5:
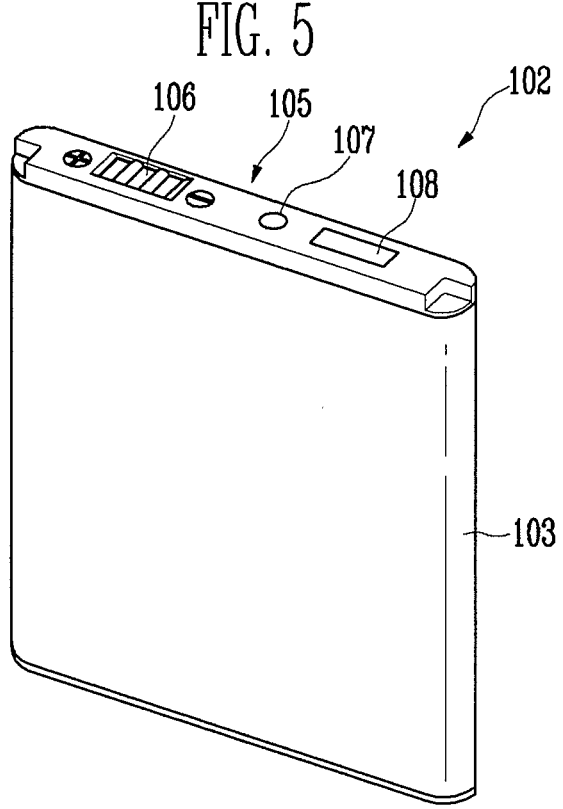
FIG. 5 is a perspective view illustrating a battery pack including the protection circuit according to the embodiment of FIG. 4.

FIG. 5 is a perspective view illustrating a battery pack including a protection circuit according to the embodiment of FIG. 4. Referring to FIG. 5, a battery pack 102 includes a body 103 accommodating a battery cell, a protection circuit coupled to the top of the body 103, and a cover 105 covering the protection circuit. A hole 106 exposes an external terminal (not shown) and a water sensitive paper 108.

The protection circuit of the battery pack includes an outputting unit 107 outputting information on an erroneous operation of the charging operation or on an error of the charging device in the external system 200.

The outputting unit 107 exposes at least a part of the battery pack 102. The outputting unit 107 outputs or displays that the erroneous operation of the charging method has occurred or displays that an error of the charging device has occurred. The outputting unit 107 indicates such using at least one of a light, a sound, and a color. For example, the outputting unit 107 is realized by an audio output device such as a speaker, a video output device such as a light emitting diode (LED), or a combination of the audio output device and the video output device. However, aspects of the present invention are not limited thereto, and the outputting unit 107 may indicate the erroneous operation of the charging method or the error of the charging device by other suitably methods and devices.

Figure 6:
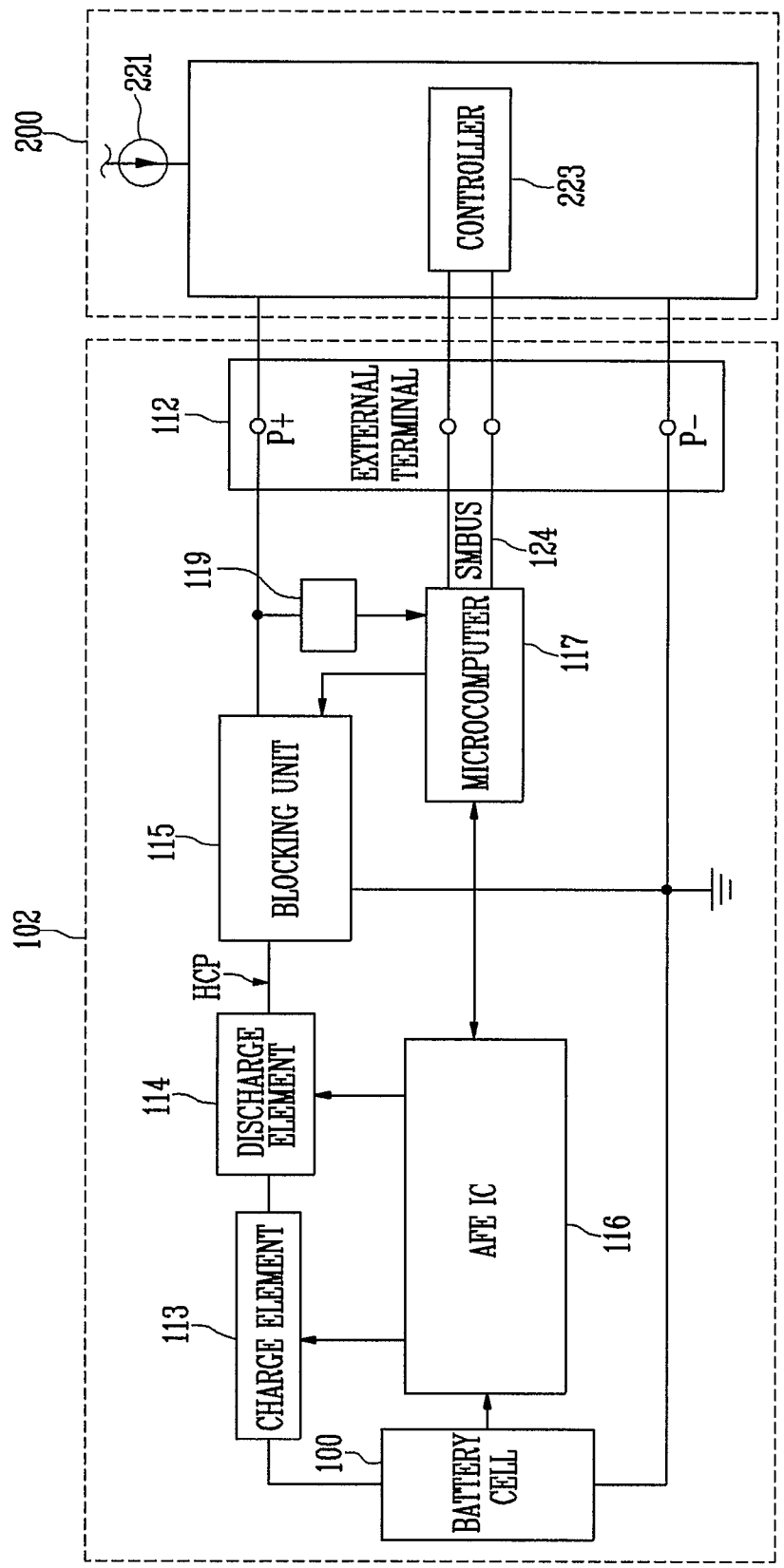
FIGS. 6 and 7 are views illustrating a protection circuit of a battery pack according to an embodiment of the present invention.
Figure 7:
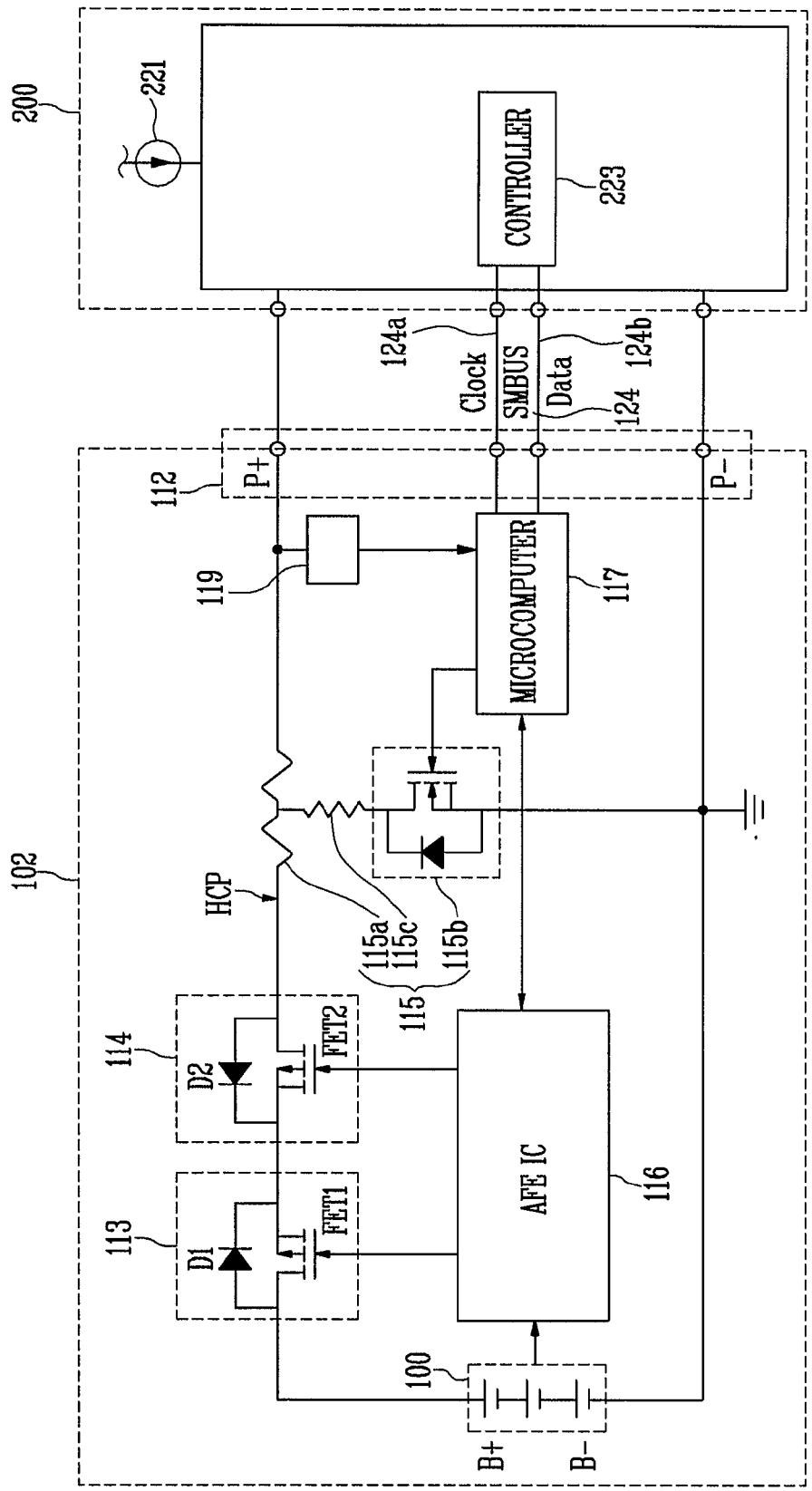

FIGS. 6 and 7 are views illustrating a protection circuit of a battery pack according to an embodiment of present invention. FIG. 6 is a block diagram illustrating a structure in which a protection circuit of the battery pack is coupled between a battery cell and an external system. FIG. 7 is a schematic circuit diagram illustrating the protection circuit of the battery pack coupled between the battery cell and the external system. Referring to FIG. 6, the battery pack 102 includes a battery cell 100, which is rechargeable, and a protection circuit which is coupled to an external system 200 to supply power to the external system 200 or to be charged by the external system 200.

The external system 200 is coupled to a common use power source (not shown) through an adaptor 221. The battery cell 100 is charged by the common use power source supplied through the external system 200. The external system 200 includes a charging device charging the battery cell 100 using a pulse charge method or a CC-CV charge method. The external system 200 includes an application apparatus (not shown) including a device capable of charging the battery pack 102. For example, the external system 200 is an electronic apparatus such as a portable notebook computer including a battery charger. However, aspects of the present invention are not limited thereto and the external system 200 may be other electronic apparatuses or suitable devices capable of charging the battery pack 102.

In the battery cell 100, a plurality of secondary batteries is connected both in series and in parallel to each other so that a predetermined amount of power is supplied to the external system 200 in the discharge mode. A high current path (HCP) between the battery cell 100 and the external terminal 112 is used as a charge and discharge path and allows a relatively large current to flow along it.

The protection circuit includes the external terminal 112, the charge element 113, the discharge element 114, a blocking unit 115, an analog front end (AFE) IC 116, and a microcontroller 117. The external terminal 112 detachably couples the battery pack 102 to the external system 200. The charge element 113 and the discharge element 114 are connected in series along the HCP between the battery cell 100 and the external terminal 112. The blocking unit 115 is connected in series to the HCP and connected in parallel to the external terminal 112. The AFE IC 116 is coupled to the battery cell 100, the charge element 113, and the discharge element 114. The microcontroller 117 is coupled to the blocking unit 115 and the AFE IC 116.

In addition, the protection circuit includes the detecting unit 119 detecting information such as a voltage and/or a current on the HCP. The detecting unit 119 transmits the detected information to the microcontroller 117. The microcontroller 117 of the protective circuit senses an abnormal charge voltage and/or current of the external system 200 and outputs error information using the outputting unit 107 (see FIG. 5).

In addition, the protection circuit includes a system management bus (SMBUS) 124 provided between the microcontroller 117 and the external terminal 112 in order to perform communication with the external system 200. The microcontroller 117 transmits the error of the charging device in the external system 200 to the controller 223 of the external system 200 through the SMBUS 124. That is, the protection circuit senses the error of the external system 200 charging the battery pack 102 and transmits information on the erroneous operation of the charging device in the external system 200 or an error of the charge mode of the external system 200 to the external system 200.

Additionally, the protection circuit blocks the coupling between the external system 200 and the battery cell 100 when the abnormal charge voltage and/or current is continuously supplied from the external system 200 to the battery cell 100 in spite of the error of the charging device. The blocking unit 115 of the protection circuit is formed of a self control protector blocking the HCP in response to a control signal of the microcontroller 117.

The elements of the battery pack 102 according to the present embodiment and the operation of the protection circuit of the battery pack 102 will be described in detail with reference to FIG. 7.

Referring to FIG. 7, first, the battery cell 100 includes at least one chargeable and dischargeable secondary battery cell. In FIG. 7, B+ and B− represent high current ends of the battery cell 100, which are power source terminals of respective ends of the serially coupled plurality of secondary batteries. The battery cell 100 outputs various information items therein, such as, a temperature of the battery cell, a charge voltage of the battery cell, and an amount of current that flows through the battery cell 100 to an analog front end (AFE) IC 116.

An external terminal 112 is coupled to the battery cell 100 in parallel and is coupled to an adaptor 221 or a load of the external system 200 to operate as a terminal when charging or discharging the battery cell 100. In FIG. 7, P+ denotes a positive electrode terminal coupled to the positive electrode power source terminal B+ of the battery cell 100 and P− denotes a negative electrode terminal coupled to the negative electrode power source terminal B− of the battery cell 100.

When the external system 200 is coupled to the external terminal 112, the adaptor 221 charges the battery cell 100. When the adaptor 221 is electrically separated from the external system 200, a load 222 of the external system 200 discharges the battery cell 100.

The charge element 113 and the discharge element 114 are serially coupled along the HCP between the external terminal 112 and the battery cell 100 to charge or discharge the battery pack 102. The charge element 113 and the discharge element 114 are realized by similar circuits both having a field effect transistor (FET) and a diode (D) connected in parallel. For example, the charge element 113 consists of FET1 and D1 and the discharge element 114 consists of FET2 and D2. A direction of a current path between a source and a drain of the FET1 of the charge element 113 is opposite to a direction of a current path of the FET2 of the discharge element 114.

That is, the FET1 of the charge element 113 is coupled to limit a flow of current from the external terminal 112 to the battery cell 100 and the FET2 of the discharge element 114 is coupled to limit a flow of current from the battery cell 100 to the external terminal 112. The diodes D1 and D2 included in the charge and discharge elements 113 and 114, respectively, are set so that current flows in a direction opposite to the direction in which current is limited by the FET1 and the FET2.

The charge and discharge elements 113 and 114 include the switching elements as the FETs FET1 and FET2. However, aspects of the present invention are not limited thereto and electrical elements that perform different kinds of switching functions may be used as the charge and discharge elements 113 and 114.

The blocking unit 115 blocks the HCP when overcharge and overdischarge occur or because of an error of the charging device of the external system 200. The blocking unit 115 includes a fuse 115a, a heater 115c, and a control switch 115b. In this case, the fuse 115a is coupled between the drain terminal of the FET2 of the discharge element 114 and the positive electrode terminal P+ of the external terminal 112. A gate terminal of the control switch 115b is coupled to the microcontroller 117 and a source terminal of the control switch 115b is grounded. The heater 115c is coupled between one end of the fuse 115a and the drain terminal of the control switch 115b.

The AFE IC 116 is coupled to the battery cell 100 in parallel between the charge element 113 and the discharge element 114 and is connected between the battery cell 100 and the microcontroller 117 in series. The AFE IC 116 transmits a voltage of the battery cell 100 to the microcontroller 117 and controls operations of the charge element 113 and the discharge element 114 by a control of the microcontroller 117. For example, in the charging mode of the battery cell 100, the AFE IC 116 sets the FET1 of the charge element 113 to be turned on and the FET2 of the discharge element 114 to be turned off so that the battery cell 100 is charged. In the discharge mode of the battery cell 100, the AFE IC 116 sets the FET1 of the charge element 113 to be turned off and the FET2 of the discharge element 114 to be turned on so that the battery cell 100 is discharged.

The microcontroller 117 controls operation of the protection circuit and is coupled to the blocking unit 115, the AFE IC 116, and the detecting unit 119. The microcontroller 117 is formed of an integrated circuit (IC) like the AFE IC 116. However, aspects of the present invention are not limited thereto and the microcontroller 117 may be formed of other suitable circuits.

The microcontroller 117 controls the charge element 113 and the discharge element 114 through the AFE IC 116 in order to block an overcharge, an overdischarge, and an overcurrent of the battery cell 100. That is, the voltage of the battery cell 100 received from the battery cell 100 through the AFE IC 116 is compared with a reference voltage set of the battery cell 100. The microcontroller 117 outputs a control signal in accordance with the comparison result to the AFE IC 116 to turn on and off the charge element 113 and/or the discharge element 114 and to block the overcharge, the overdischarge, and the overcurrent of the battery cell 100.

Furthermore, the microcontroller 117 measures the voltage of the charging device in at least one of the charge stop periods between pulses of the charging operation and compares the measured voltage of the charging device with the reference voltage. The comparison is used to determine the erroneous operation of the charging device occurs when the charging method of the battery cell 100 is the pulse charge method.

The reference voltage is a voltage on a voltage characteristic graph (refer to FIG. 2) previously set when the pulse charge occurs. For example, the reference voltage is the charge voltage of the battery cell 100 obtained before the charge stop period is generated while the microcontroller 117 monitors the voltage of the battery cell 100 when the pulse charge is used to charge the battery cell 100. However, aspects of the present invention are not limited thereto and the reference voltage may be other suitable voltages.

In addition, in the charge mode of the battery cell 100, the microcontroller 117 arbitrarily and momentarily changes the charge element 113 from an on state to an off state in a CC period or a CV period when the charge method of the charging device of the external system 200 is the CC-CV charge method. The microcontroller 117 detects a voltage or a current between the terminals P+ and P− of the external system 200 in the charge stop period, and compares the detected voltage or current with the reference voltage or a reference current to determine the whether an erroneous charging operation or an error of the charging device of the external system 200 occurs.

The reference voltage or reference current is the voltage on the CV-CC characteristic graph (refer to FIG. 4) previously set during the CC-CV charging of the battery cell 100. For example, the reference voltage becomes the voltage of the CV charge period of the battery cell 100 and the reference current becomes the current of the CC charge period of the battery cell 100. The microcontroller 117 momentarily turns off the charge element 113 in the CV charge period and/or the CC charge period while monitoring the charge voltage or current of the battery cell 100 so that the charge stop period is arbitrarily formed.

In addition, the microcontroller 117 communicates with the external system 200 through the SMBUS 124. The microcontroller 117 transmits information such as the voltage of the battery cell 100 and the error of the charging device of the external system 200 to the controller 223 of the external system 200. The information is synchronized with the clock signal of a clock line 124a of the SMBUS 124 to be transmitted to the external system 200 through a data line 124b of the SMBUS 124.

In addition, when the erroneous operation or error of the external system 200 is sensed, the microcontroller 117 turns off the charge element 113 and the discharge element 114 or transmits the control signal to the blocking unit 115 to prevent the battery cell 100 from being charged. For example, the microcontroller 117 activates the control switch 115b of the blocking unit 115 so that a high current along the HCP is induced to the heater 115c through the fuse 115a. The heater 115c heated by the induced high current has the fuse 115a melted to be cut off. Therefore, the flow of the current of the HCP is blocked so that it is possible to prevent the abnormal charge voltage and/or current to be supplied to the battery cell 100.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A protection circuit of a battery pack having a battery cell charged by a charging device, the protection circuit comprising:
    a charge switch coupled to a high current path (HCP), the charge switch disposed between the battery cell and the charging device configured to charge the battery cell;
    a detecting unit coupled to the HCP at a node between the charge switch and the charging device and configured to detect a voltage or a current on the HCP of the charging device;
    a controller configured to sense the voltage or the current of the charging device through the detecting unit during a charge stop period stopping a charging of the battery cell and to determine whether or not an error of the charging device occurs according to the voltage or the current of the charging device, and
    a blocking unit configured to block coupling between the charging device and the battery cell when the error occurs, wherein the blocking unit comprises:
        a fuse coupled to the HCP in series;
        a heater having a first terminal coupled to an end of the fuse; and
        a control switch coupled between a second terminal of the heater and a ground, wherein a gate terminal of the control switch is coupled to the controller.

2. The protection circuit as claimed in claim 1, wherein the charge stop period comprises a period in which the charge switch is turned off in at least one of periods between adjacent pulses of a pulse charging of the battery cell.

3. The protection circuit as claimed in claim 2, wherein the controller is configured to compare the voltage of the charging device with a reference voltage corresponding to a charge voltage characteristic of the battery cell and to determine whether the error occurs according to a comparison result.

4. The protection circuit as claimed in claim 1, wherein the charge stop period comprises a period in which the charge switch is turned off when the battery cell is charged by a constant current-constant voltage (CC-CV) method.

5. The protection circuit as claimed in claim 4, wherein the controller is configured to turn off the charge switch.

6. The protection circuit as claimed in claim 4, wherein the controller is configured to compare the voltage or the current of the charging device with a reference voltage or a reference current corresponding to a CC-CV characteristic and to determine whether the error occurs according to a comparison result.

7. The protection circuit as claimed in claim 1, wherein the controller is configured to output information on the error to the charging device.

8. The protection circuit as claimed in claim 7, further comprising an outputting unit configured to display information on the error by a light, a sound, or a combination of the light and the sound.

9. The protection circuit as claimed in claim 7, wherein the information on the error is transmitted to the charging device.

10. The protection circuit as claimed in claim 1, further comprising a discharge switch coupled to the HCP and disposed in series between the battery cell and the charging device.

11. The protection circuit as claimed in claim 1, wherein the controller comprises an analog front end (AFE) integrated circuit (IC) and a microcontroller.

12. The protection circuit as claimed in claim 1, further comprising an external terminal, comprising:
a first power source terminal coupled to the HCP;
a second power source terminal coupled to the HCP; and
at least one signal terminal configured to transmit information on the error to the charging device.

13. The protection circuit as claimed in claim 1, wherein the battery cell comprises at least one of a chargeable and a dischargeable secondary battery.

14. The protection circuit as claimed in claim 1, wherein the charging device is an electronic apparatus including a battery charger or an adaptor.

15. The protection circuit as claimed in claim 11, further comprising a system management bus (SMBUS) having a clock line and a data line connecting the microcontroller to an external system.

* * * * *